(12) United States Patent
Murray

(10) Patent No.: US 8,953,227 B2
(45) Date of Patent: Feb. 10, 2015

(54) MULTIFUNCTION PRINTER WITH PLATEN CLOSEST TO LID

(75) Inventor: Richard A. Murray, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 149 days.

(21) Appl. No.: 13/535,876

(22) Filed: Jun. 28, 2012

(65) Prior Publication Data

US 2014/0002965 A1  Jan. 2, 2014

(51) Int. Cl.
*H04N 1/04* (2006.01)

(52) U.S. Cl.
USPC .................... 358/474; 358/401; 358/296

(58) Field of Classification Search
USPC .......................................... 358/474
See application file for complete search history.

(56) References Cited

U.S. PATENT DOCUMENTS

| 3,315,084 | A | * | 4/1967 | Bertram | 250/239 |
| 6,169,858 | B1 | | 1/2001 | Ray | |
| 7,350,902 | B2 | | 4/2008 | Dietl et al. | |
| 7,733,539 | B2 | | 6/2010 | Edwards et al. | |
| 7,871,145 | B1 | * | 1/2011 | Enge | 347/19 |
| 7,969,623 | B2 | * | 6/2011 | Kagami et al. | 358/498 |
| 2006/0256401 | A1 | * | 11/2006 | Tregoning | 358/474 |
| 2009/0231483 | A1 | * | 9/2009 | Seddik et al. | 348/373 |
| 2009/0251739 | A1 | * | 10/2009 | Cook et al. | 358/474 |
| 2009/0269835 | A1 | * | 10/2009 | Ceremony et al. | 435/286.2 |
| 2010/0053706 | A1 | * | 3/2010 | Jasinski et al. | 358/498 |

* cited by examiner

*Primary Examiner* — King Poon
*Assistant Examiner* — Ibrahim Siddo
(74) *Attorney, Agent, or Firm* — Peyton C. Watkins

(57) ABSTRACT

A multifunction printer includes a printing apparatus including: a printing device for printing on recording medium; a media advance system for moving the recording medium into position to be printed on by the printing device; and a scanning apparatus including: a platen including: a transparent portion; a first surface for supporting items to be scanned; a second surface opposite the first surface; a scan bar assembly disposed proximate the second surface of the platen; a frame including an uppermost surface that is disposed proximate to the second surface of the platen; and a lid disposed proximate the first surface of the platen, wherein a distance between the lid and the first surface of the platen is less than a distance between the lid and the frame when the lid is closed.

18 Claims, 16 Drawing Sheets

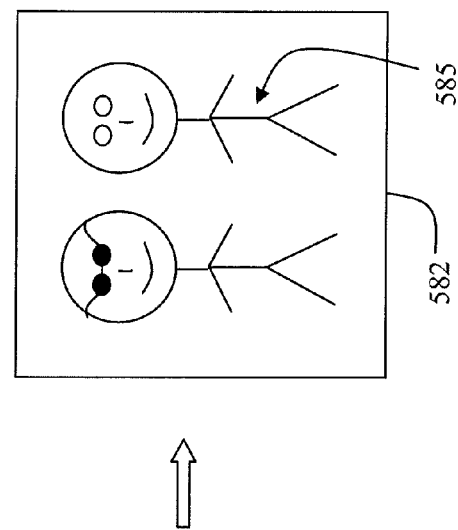
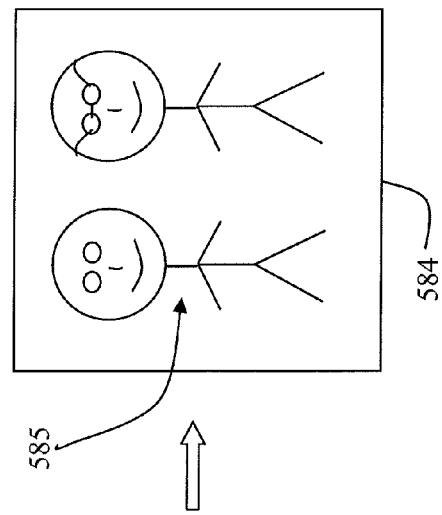
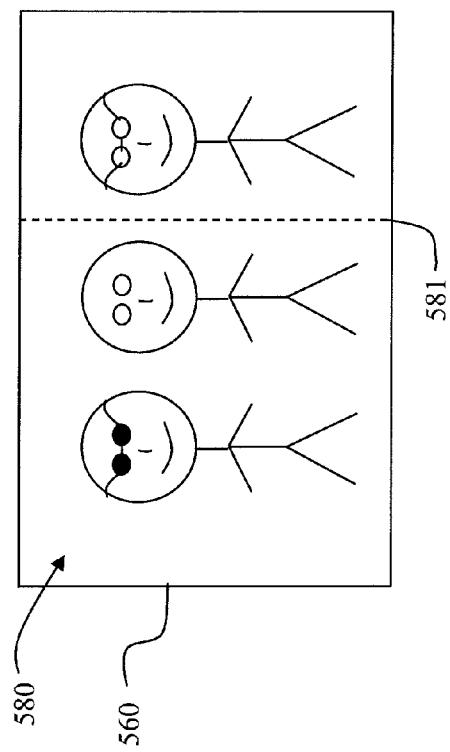
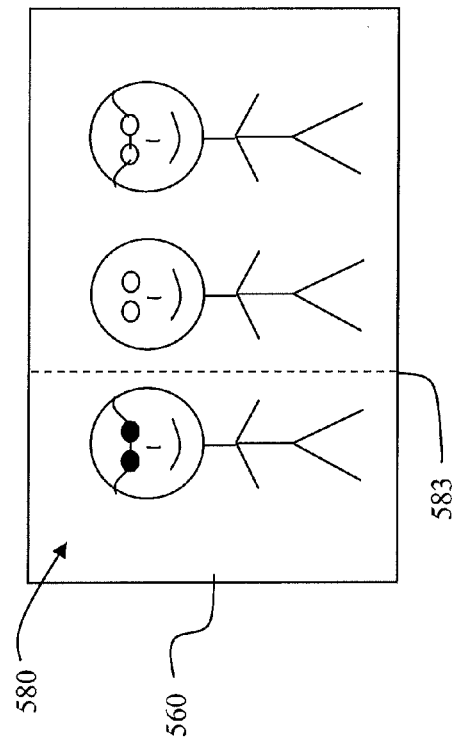
FIG. 14A
FIG. 14B

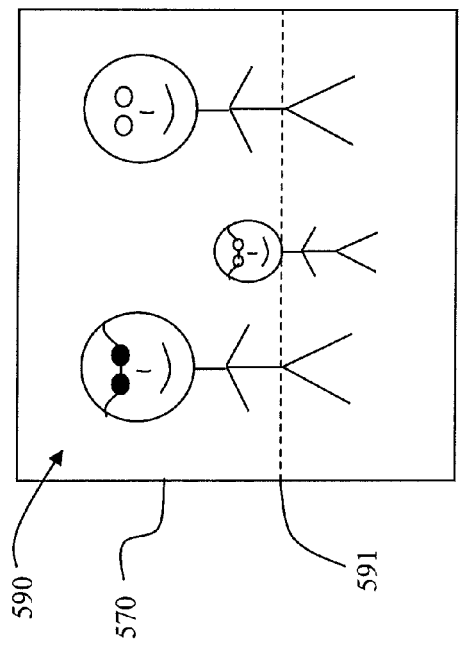
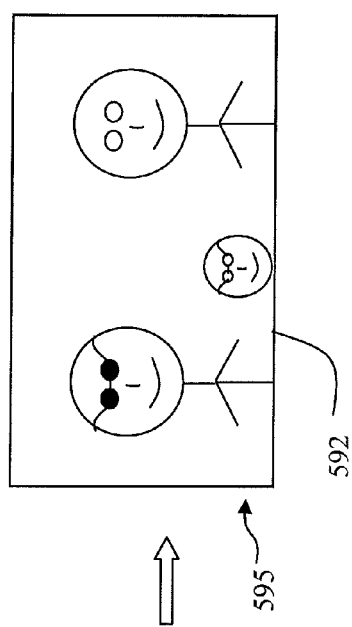
FIG. 15A
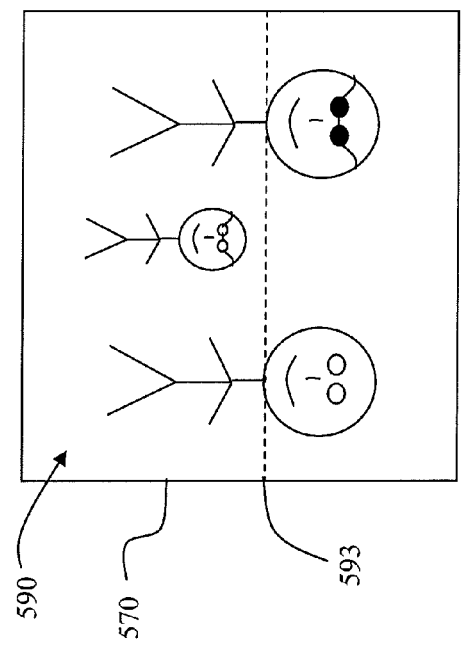
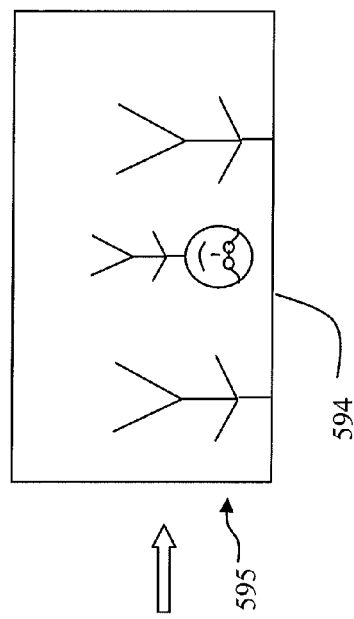
FIG. 15B

MULTIFUNCTION PRINTER WITH PLATEN CLOSEST TO LID

CROSS REFERENCE TO RELATED APPLICATIONS

Reference is made to commonly assigned, U.S. patent application Ser. No. 13/535,912, concurrently filed herewith, entitled "Scanning of Oversized Documents" by Rich Murray and Gary Kneezel, the disclosure of which is herein incorporated by reference.

FIELD OF THE INVENTION

The present invention relates generally to the platen of a scanning apparatus in a multifunction printer, and more particularly to a platen supported by a frame.

BACKGROUND OF THE INVENTION

Multifunction printers include a printing apparatus for the printing of documents, as well as a scanning apparatus for scanning or copying documents or other objects. A conventional optical scanning apparatus includes a transparent platen for holding the item to be scanned. A lid covers the platen when not in use, as well as during the scanning process in order to prevent excessive stray light from entering the optical sensor array.

Optical scanners operate by imaging an object (e.g. a document) with a light source, and sensing a resultant light signal with an optical sensor array. Each optical sensor or photoreceptor in the array (typically a linear array) produces a data signal representative of the intensity of light impinged thereon for a corresponding portion of the imaged object. The data signals from the array of sensors are then processed (typically digitized) and stored in a temporary memory such as a semiconductor memory or on a hard disk of a computer, for example, for subsequent manipulation and printing or display, such as on a computer monitor. The image of the scanned object is projected onto the optical photo sensor array incrementally by use of a moving scan line. The moving scan line is produced either by moving the document with respect to the scan bar assembly that includes the array of optical sensors, or by moving the scan bar assembly relative to the document.

A common type of scanner uses a contact image sensor (CIS) scan bar. A CIS scan bar includes a contact image sensor scan element having a length that is substantially equal to the width of the scanning region. The photoreceptors in a CIS are substantially the same size as the pixel resolution of the scanner. The CIS has a short depth of field and is typically mounted beneath the transparent platen upon which the document is placed. A scan bar assembly includes the CIS scan element, as well as gears for power transmission to move the scan bar assembly. One or more roller spacers in the CIS scan bar assembly are biased against the bottom of the scanner glass so that the CIS scan element is always at substantially the same distance from the top of the transparent platen.

In a conventional multifunction printer, the transparent platen is recessed within a frame, such that when the lid is closed, the lid typically contacts the top of the frame rather than the top of the transparent platen. Typically, attached to the lid is a white reflective backing plate that protrudes into the recess to hold the original to be scanned flat against the top of the transparent platen. Thus, the recessing of the transparent platen below the top of the frame requires an additional part as well as additional height of the multifunction printer.

In addition, in some instances a user desires to scan or copy a portion of a document that extends beyond the recess. It can be difficult to position such a document without creasing it or moving it when the lid closes over it and the backing plate pushes part of the document down against the transparent platen, while another part of the document extends beyond the recess over the frame.

What is needed is a multifunction printer with a scanning apparatus having a reduced overall height, fewer parts, and the ability to more readily scan oversized documents. Additionally, an aesthetically pleasing appearance of the scanning apparatus that distinguishes the multifunction printer from conventional multifunction printers can also be advantageous.

SUMMARY OF THE INVENTION

The present invention is directed to overcoming one or more of the problems set forth above. Briefly summarized, according to one aspect of the invention, the invention resides in a multifunction printer comprising: a printing apparatus including: a printing device for printing on recording medium; a media advance system for moving the recording medium into position to be printed on by the printing device; and a scanning apparatus including: a platen including: a transparent portion; a first surface for supporting items to be scanned; a second surface opposite the first surface; a scan bar assembly disposed proximate the second surface of the platen; a frame including an uppermost surface that is disposed proximate to the second surface of the platen; and a lid disposed proximate the first surface of the platen, wherein a distance between the lid and the first surface of the platen is less than a distance between the lid and the frame when the lid is closed.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIGS. 14A and 14B schematically represent a first scan and a second scan of an oversized long document;

FIGS. 15A and 15B schematically represent a first scan and a rotated second scan of an oversized wide document.

DETAILED DESCRIPTION OF THE INVENTION

Figure 1:
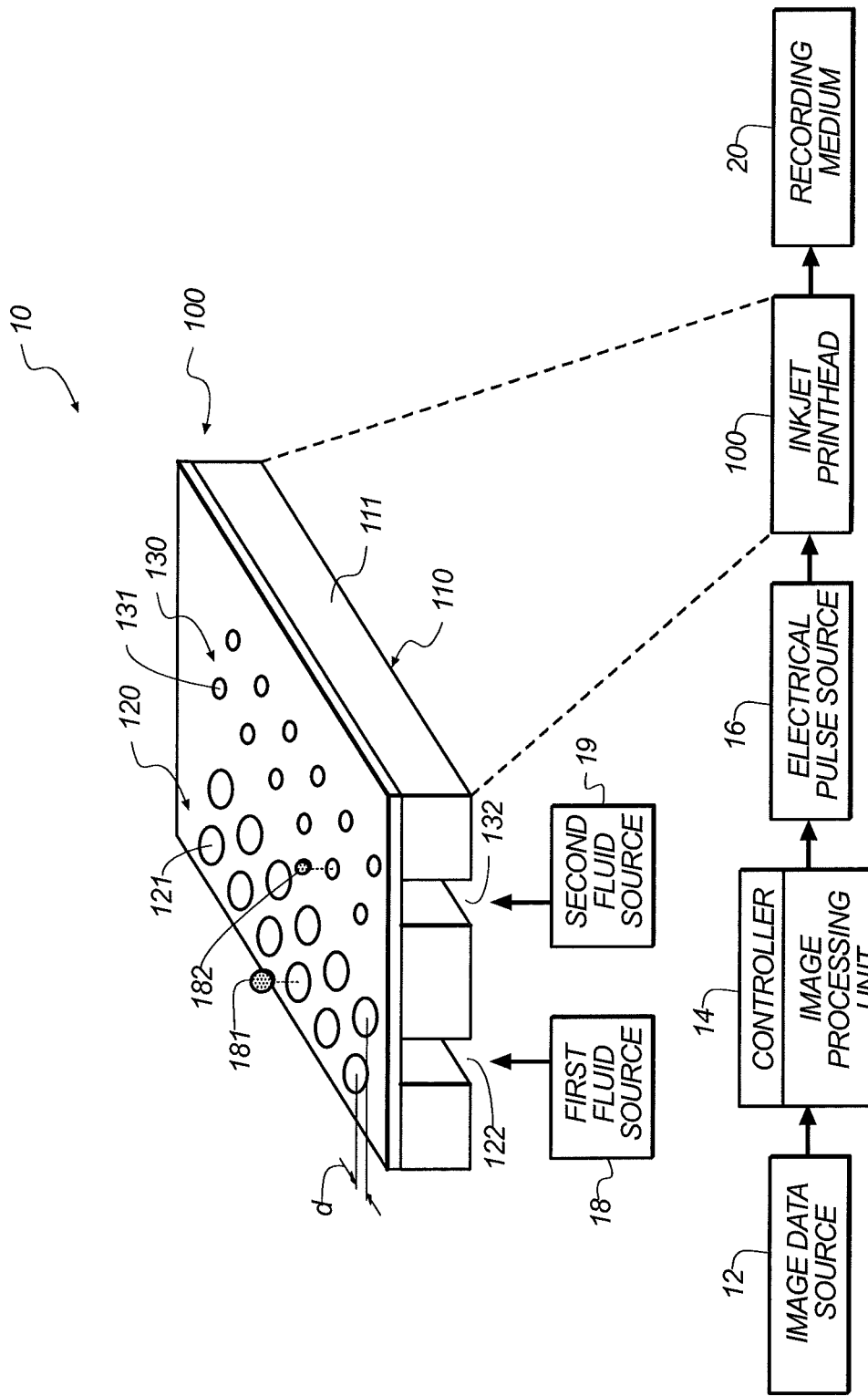
FIG. 1 is a schematic representation of an inkjet printer system.

Referring to FIG. 1, a schematic representation of an inkjet printer system 10 is shown, for its usefulness with the present invention and is fully described in U.S. Pat. No. 7,350,902, and is incorporated by reference herein in its entirety. Inkjet printer system 10 includes an image data source 12, which provides data signals that are interpreted by a controller 14 as commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays. Nozzles 121 in the first nozzle array 120 have a larger opening area than nozzles 131 in the second nozzle array 130. In this example, each of the two nozzle arrays 12, 130 has two staggered rows of nozzles 121, 131, each row having a nozzle density of 600 per inch. The effective nozzle density then in each nozzle array 120, 130 is 1200 per inch (i.e. d=$\frac{1}{1200}$ inch in FIG. 1). If pixels on the recording medium 20 were sequentially numbered along the paper advance direction, the nozzles 121, 131 from one row of a nozzle array 120, 130 would print the odd numbered pixels, while the nozzles 121, 131 from the other row of the nozzle array 120, 130 would print the even numbered pixels.

In fluid communication with each nozzle array 120, 130 is a corresponding ink delivery pathway. Ink delivery pathway 122 is in fluid communication with the first nozzle array 120, and ink delivery pathway 132 is in fluid communication with the second nozzle array 130. Portions of ink delivery pathways 122 and 132 are shown in FIG. 1 as openings through printhead die substrate 111. One or more inkjet printhead die 110 will be included in inkjet printhead 100, but for greater clarity only one inkjet printhead die 110 is shown in FIG. 1. In FIG. 1, first fluid source 18 supplies ink to first nozzle array 120 via ink delivery pathway 122, and second fluid source 19 supplies ink to second nozzle array 130 via ink delivery pathway 132. Although distinct fluid sources 18 and 19 are shown, in some applications it may be beneficial to have a single fluid source supplying ink to both the first nozzle array 120 and the second nozzle array 130 via ink delivery pathways 122 and 132 respectively. Also, in some embodiments, fewer than two or more than two nozzle arrays 120, 130 can be included on printhead die 110. In some embodiments, all nozzles on inkjet printhead die 110 can be the same size, rather than having multiple sized nozzles on inkjet printhead die 110.

Not shown in FIG. 1, are the drop forming mechanisms associated with the nozzles 121, 131. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording medium 20.

Figure 2:
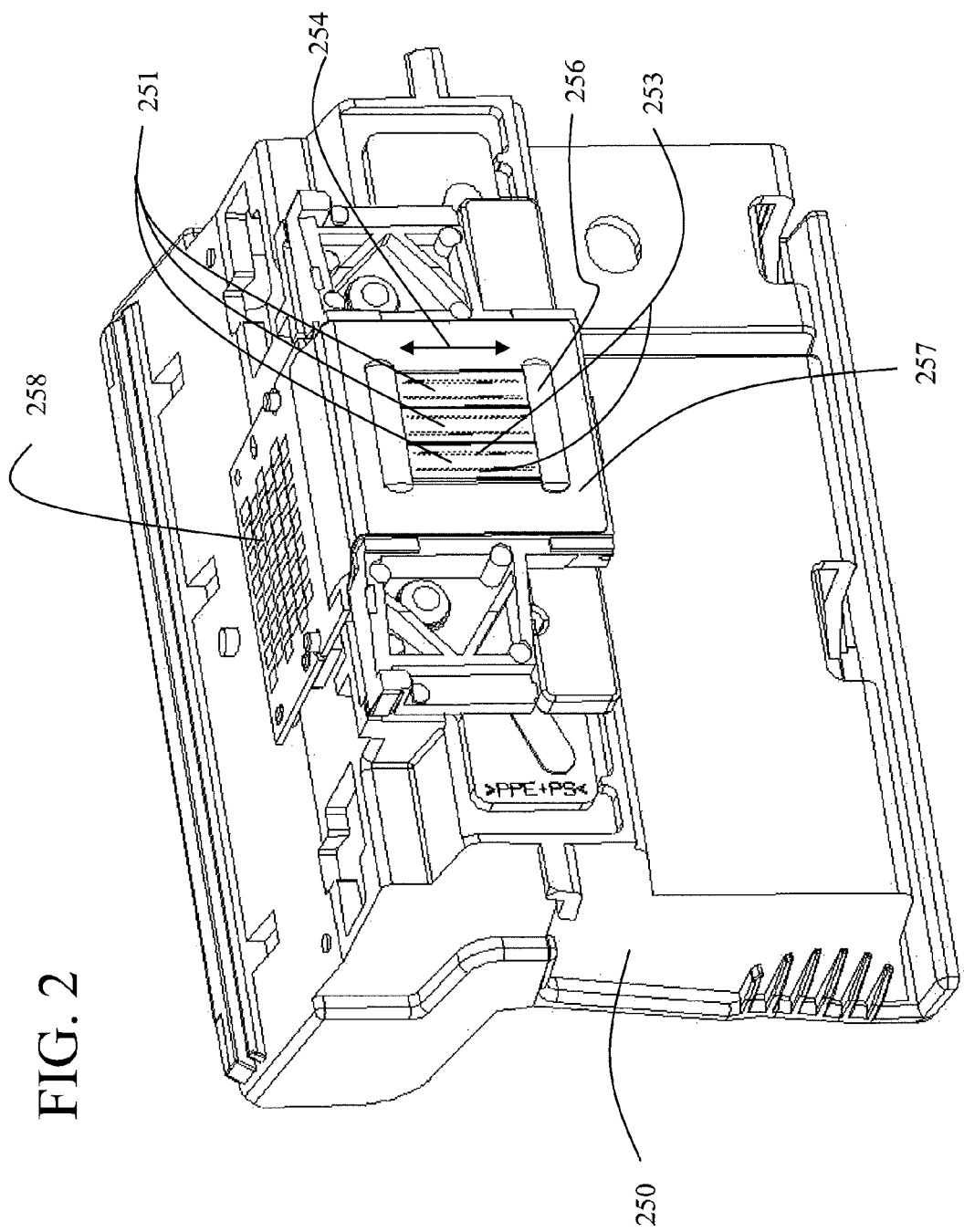
FIG. 2 is a perspective of a portion of a printhead.

FIG. 2 shows a perspective of a portion of a printhead 250, which is an example of an inkjet printhead 100. Printhead 250 includes three printhead die 251 (similar to printhead die 110 in FIG. 1), each printhead die 251 containing two nozzle arrays 253, so that printhead 250 contains six nozzle arrays 253 altogether. The six nozzle arrays 253 in this example can each be connected to separate ink sources (not shown in FIG. 2); such as cyan, magenta, yellow, text black, photo black, and a colorless protective printing fluid. Each of the six nozzle arrays 253 is disposed along nozzle array direction 254, and the length of each nozzle array 253 along the nozzle array direction 254 is typically on the order of 1 inch or less. Typical lengths of recording media 20 are 6 inches for photographic prints (4 inches by 6 inches) or 11 inches for paper (8.5 by 11 inches). Thus, in order to print a full image, a number of swaths are successively printed while moving printhead 250 across the recording medium 20. Following the printing of a swath, the recording medium 20 is advanced along a media advance direction that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. Flex circuit 257 bends around the side of printhead 250 and connects to connector board 258. When printhead 250 is mounted into the carriage 200 (see FIG. 3), connector board 258 is electrically connected to a connector (not shown) on the carriage 200, so that electrical signals can be transmitted to the printhead die 251.

Figure 3:
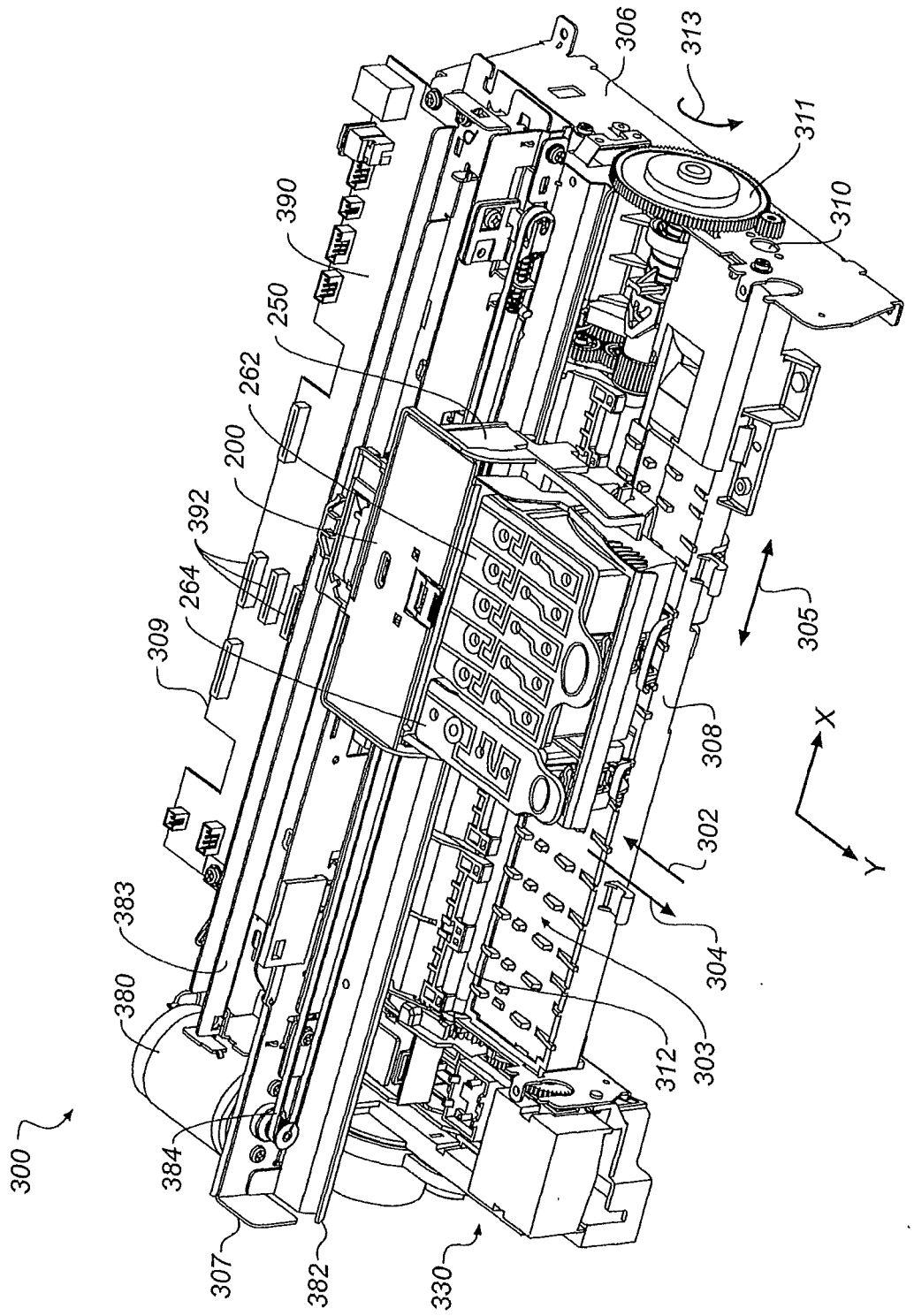
FIG. 3 is a perspective of a portion of a carriage printer.

FIG. 3 shows a portion of a desktop carriage printer. Some of the parts of the printer have been hidden in the view shown in FIG. 3 so that other parts can be more clearly seen. Printing mechanism 300 has a print region 303 across which carriage 200 is moved back and forth in carriage scan direction 305 along the X axis, between the right side 306 and the left side 307 of printing mechanism 300, while drops are ejected from printhead die 251 (not shown in FIG. 3) on printhead 250 that is mounted on carriage 200. Carriage motor 380 moves belt 384 to move carriage 200 along carriage guide rail 382. An encoder sensor (not shown) is mounted on carriage 200 and indicates carriage location relative to an encoder fence 383.

Printhead 250 is mounted in carriage 200, and multi-chamber ink supply 262 and single-chamber ink supply 264 are mounted in the printhead 250. The mounting orientation of printhead 250 is rotated relative to the view in FIG. 2, so that the printhead die 251 are located at the bottom side of printhead 250, the droplets of ink ejected downward onto the recording medium 20 in print region 303 in the view of FIG. 3. Multi-chamber ink supply 262, in this example, contains five ink sources: cyan, magenta, yellow, photo black, and colorless protective fluid; while single-chamber ink supply 264 contains the ink source for text black. Paper or other recording medium 20 (sometimes generically referred to as paper or media herein) is loaded along paper load entry direction 302 toward the front of printing mechanism 308.

Figure 4:
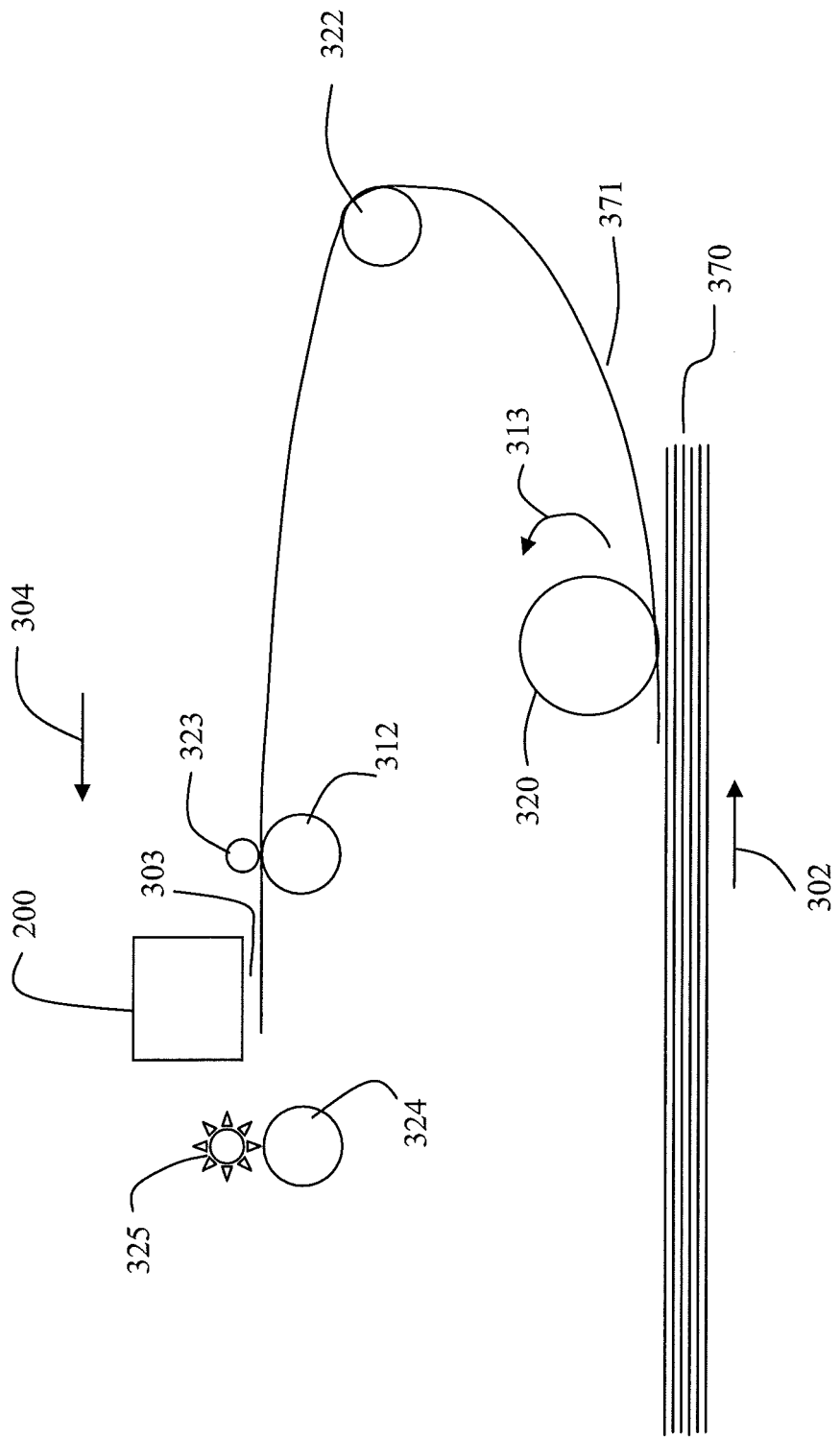
FIG. 4 is a schematic side view of an exemplary paper path in a carriage printer.

A variety of rollers are used to advance the recording medium 20 through the printer as shown schematically in the side view of FIG. 4. In this example, a pick-up roller 320 moves the top piece or sheet 371 of a stack 370 of paper or other recording medium 20 in the direction of arrow, paper load entry direction 302. A turn roller 322 acts to move the paper around a C-shaped path (in cooperation with a curved rear wall surface) so that the paper continues to advance along media advance direction 304 from the rear 309 of the printing mechanism (with reference also to FIG. 3). The paper is then moved by feed roller 312 and idler roller(s) 323 to advance along the Y axis across print region 303, and from there to a discharge roller 324 and star wheel(s) 325 so that printed paper exits along media advance direction 304. Feed roller 312 includes a feed roller shaft along its axis, and feed roller gear 311 is mounted on the feed roller shaft. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller.

The motor that powers the paper advance rollers is not shown in FIG. 3, but the hole 310 at the right side of the printing mechanism 306 is where the motor gear (not shown) protrudes through in order to engage feed roller gear 311, as well as the gear for the discharge roller (not shown). For normal paper pick-up and feeding, it is desired that all rollers rotate in forward rotation direction 313. Toward the left side of the printing mechanism 307, in the example of FIG. 3, is the maintenance station 330.

Toward the rear of the printing mechanism 309, in this example, is located the electronics board 390, which includes cable connectors 392 for communicating via cables (not shown) to the printhead carriage 200 and from there to the printhead 250. Also on the electronics board 390 are typically mounted motor controllers for the carriage motor 380 and for the paper advance motor, a clock for measuring elapsed time, a processor and other control electronics (shown schematically as controller 14 and image processing unit 15 in FIG. 1) for controlling the printing process, and an optional connector for a cable to a host computer.

Figure 5:
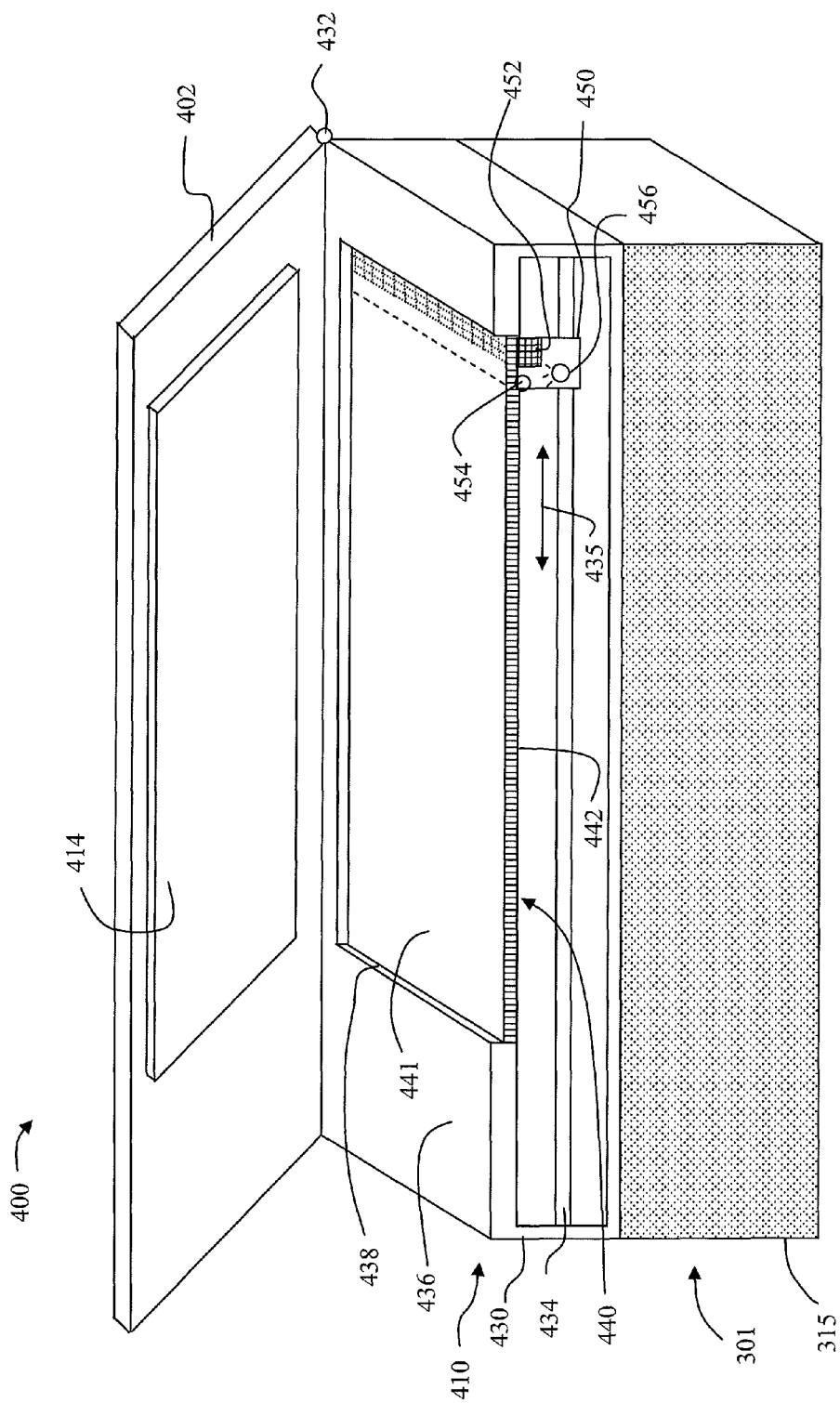
FIG. 5 is a perspective of a multifunction printing system having a prior art platen configuration in the scanning apparatus.

FIG. 5 shows a perspective of a prior art multifunction printing system 400 having a printing apparatus 301 including a printing mechanism for printing images, such as printing mechanism 300 (FIG. 3), enclosed within a housing 315, and also a scanning apparatus 410 for scanning documents or other items, where scanning apparatus 410 includes a prior art configuration of a recessed platen 440 within a frame 436. In this view, the front portion of scanning apparatus 410 is cut away in order to show internal features of the scanning apparatus 410 more clearly. Multifunction printing system 400 can do printing, scanning of documents, or copying of documents (i.e. printing plus scanning).

Scanning apparatus 410 includes scanning apparatus body 430 and lid 402, which is pivotably attached to scanning apparatus body 430 by hinge 432. The surface of scanning apparatus body 430 that is covered by lid 402 when lid 402 is closed includes a frame 436. Transparent platen 440 (typically a flat piece of glass) is inset and recessed within the frame 436. Platen 440 includes a first surface 441 for supporting items to be scanned and a second surface 442 opposite the first surface 441. First surface 441 of the transparent platen 440 is lower than the uppermost surface of frame 436 so that there is an offset 438. In other words, when lid 402 is closed, a distance between lid 402 and first surface 441 of platen 440 is greater than a distance between lid 402 and an uppermost surface of frame 436. Platen 440 is not covered by lid 402 when the lid 402 is open as it is in FIG. 5.

Below transparent platen 440 is movable scan bar assembly 450. In the example shown in FIG. 5, scan bar assembly 450 includes a photosensor array (such as a contact image sensor) 452 extending the width of the transparent platen 440, a roller 454 that is biased into contact with the second surface 442 of the transparent platen 440, and a light source 456 that illuminates a scan line of a document or other item (not shown) that is placed on first surface 441 of transparent platen 440. A light guide and other optics (not shown) can also be included in scan bar assembly 450. Scan bar assembly 450 is moved back and forth along scanning guide 434 in direction 435 across the length of transparent platen 440 in order to scan the document or other item, receiving reflected light from the item through the transparent platen 440 scan line by scan line and converting the reflected light into electrical signals. A controller (e.g. controller 14 of FIG. 1) converts the electrical signals into digitized data to form a digitized image of the item. Scanning guide 434 can be a round rail, a rack and pinion or other guiding member that can use the power of a motor (not shown) to provide a linear motion along the scanning direction 435.

Attached to lid 402 is a reflective backing plate 414. The thickness of reflective backing plate 414 is accommodated in offset 438 between frame 436 and the top surface of the recessed transparent platen 440 when scanner lid 402 is closed. Reflective backing plate 414 can be resiliently mounted on lid 402, so that reflective backing plate 414 is effective in pressing documents of various thicknesses against transparent platen 440. Typically reflective backing plate 414 is white in the document scanning region.

Figure 6:
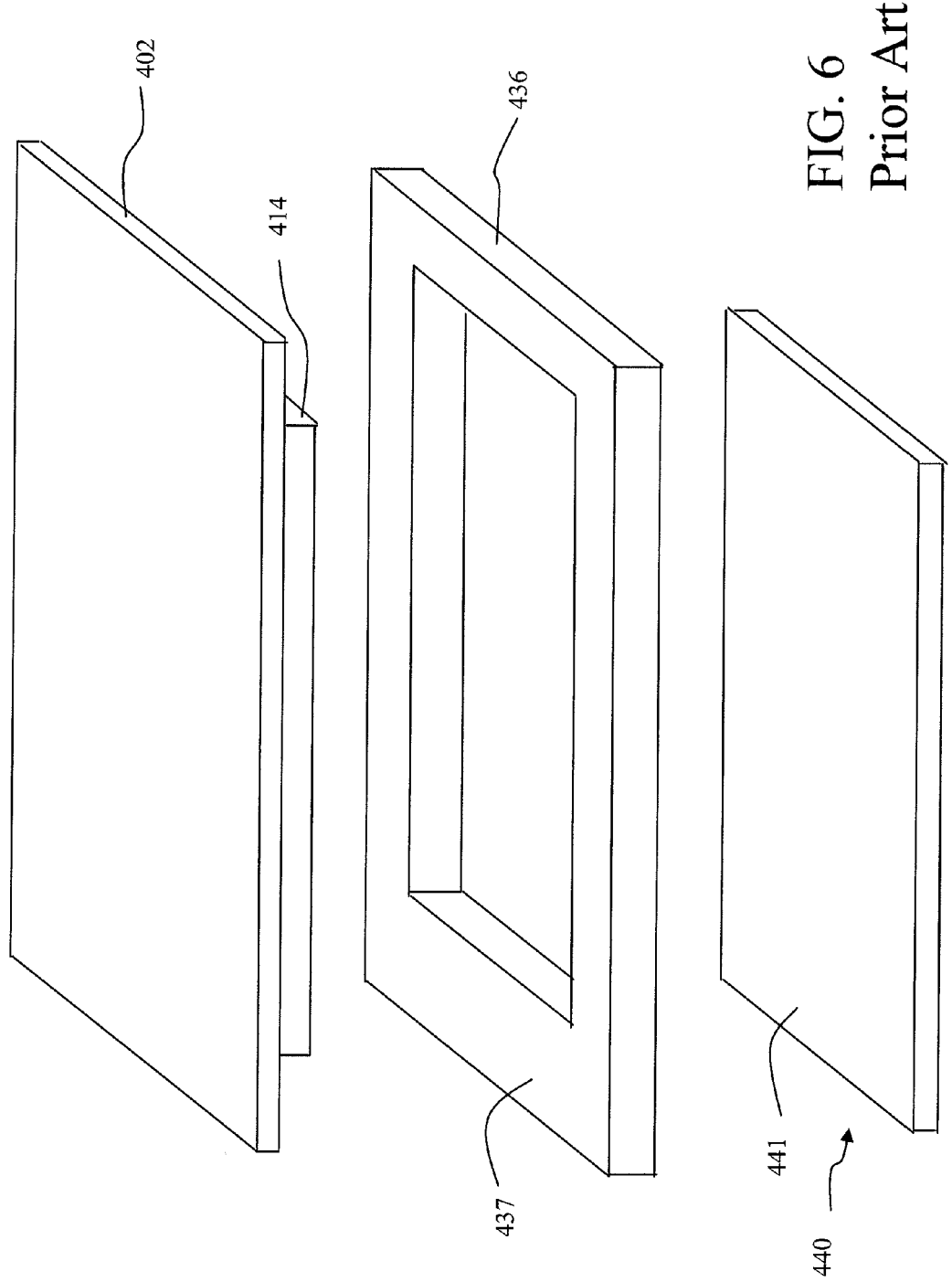
FIG. 6 is an exploded view of a prior art configuration of platen, frame and lid of the scanning apparatus.

FIG. 6 schematically shows an exploded perspective of the lid 402, frame 436 and platen 440 in the prior art configuration as in FIG. 5. First surface 441 of platen 440 is affixed to a lower surface (opposite uppermost surface 437) of frame 436. Lid 402 is closer to uppermost surface 437 of frame 436 than it is to first surface 441 of platen 440.

Figure 7:
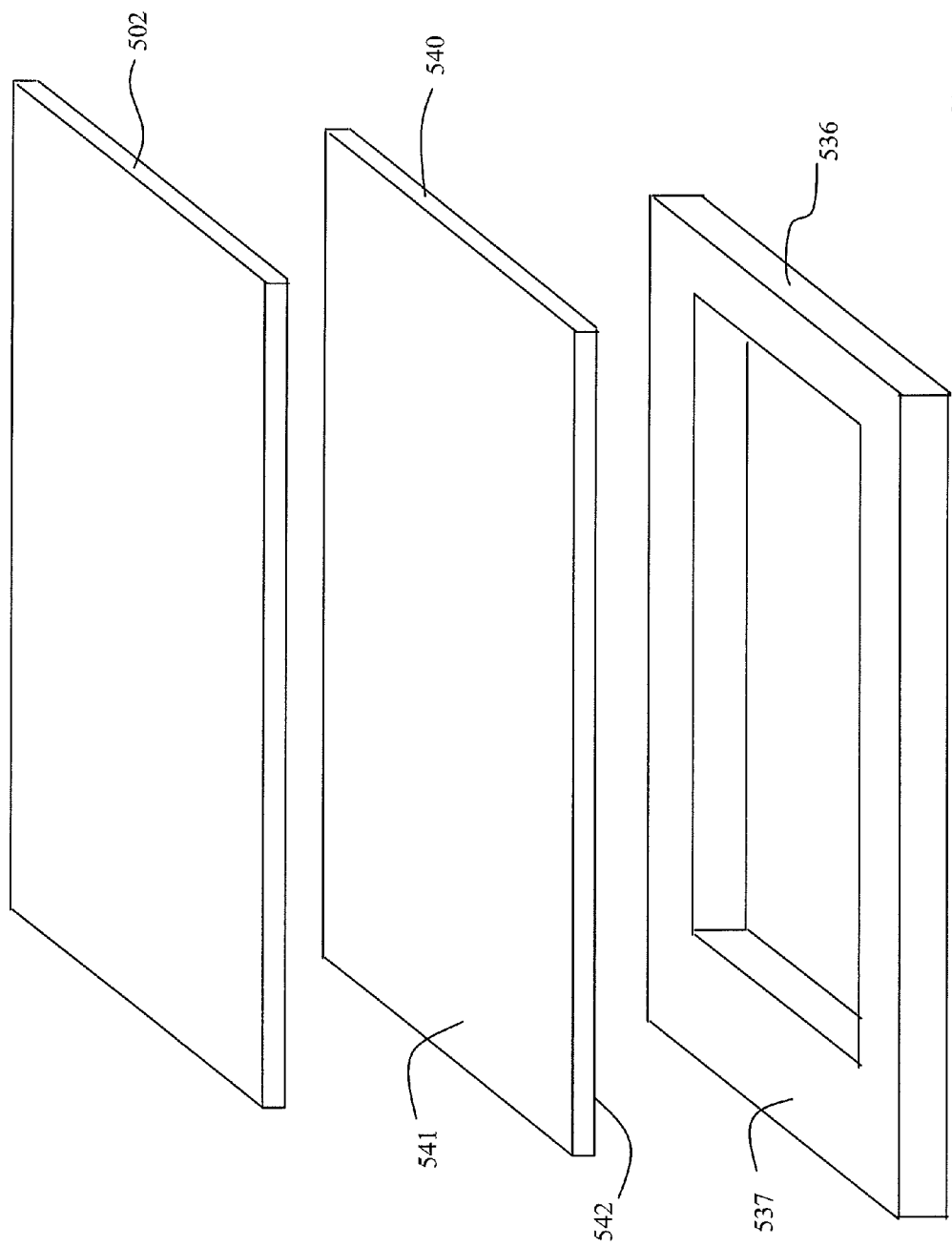
FIG. 7 is an exploded view of a configuration of platen, frame and lid according to a an embodiment of the invention.

FIG. 7 schematically shows an exploded perspective of the lid 502, frame 536 and platen 540 of a scanning apparatus 510 (FIG. 8B) of multifunction printer 500 (FIG. 9) according to an embodiment of the invention. Rather than frame 436 being closer to lid 402, as in the prior art configuration of FIG. 6, platen 540 is closer to lid 502 than frame 536 is in the embodiment shown in FIG. 7. Second surface 542 of platen 540 is located on top of uppermost support surface 537 of frame 536. In some embodiments (not shown) in order to help secure the platen 540 in position, a raised rim 539 (FIG. 8B) of frame 536 surrounds the periphery of platen 540 so that the upper surface of the raised rim 539 (FIG. 8B) is higher than the uppermost support surface 537. However, in such embodiments the upper surface of the raised rim 539 (FIG. 8B) is lower than first surface 541 of platen 540. In general, in embodiments of the invention, a distance between the lid 502 and the first surface 541 of the platen 540 is less than a distance between the lid 502 and the frame 540 when the lid 502 is closed.

Figure 8A:
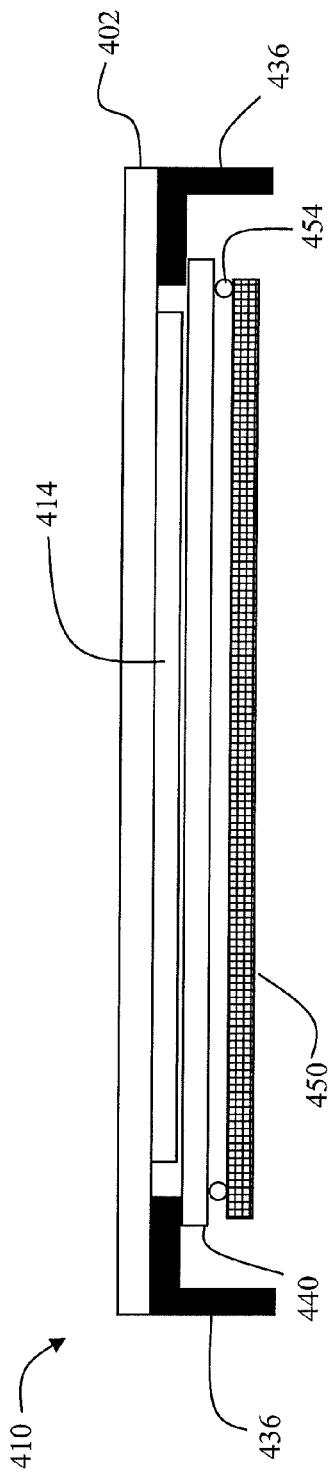
FIG. 8A is a cross-sectional view of a prior art configuration of platen, frame and lid of the scanning apparatus.
Figure 8B:
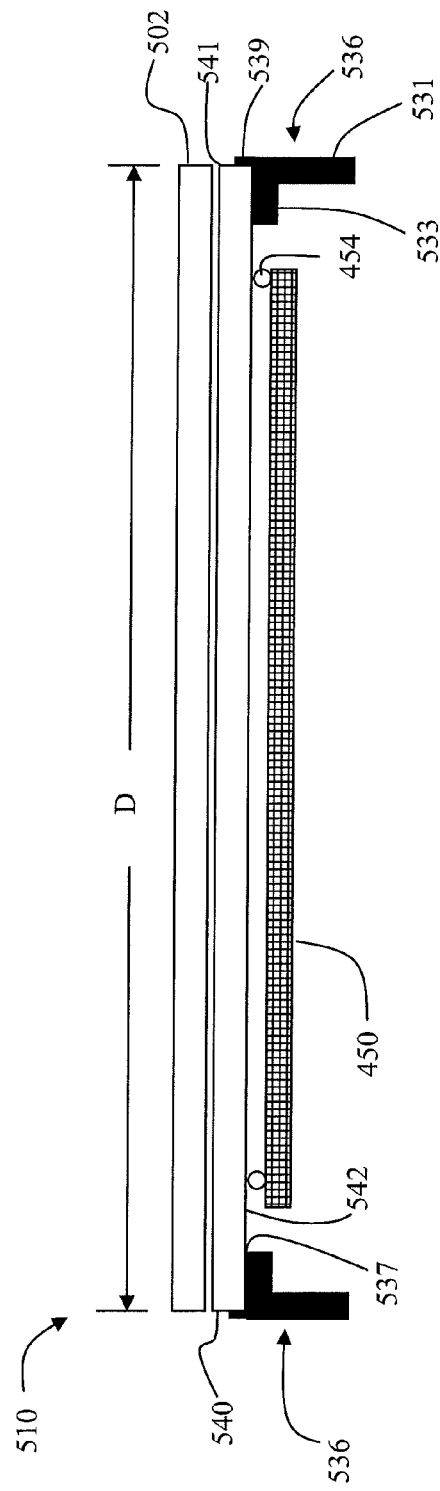
FIG. 8B is a cross-sectional view of a configuration of platen, frame and lid according to a an embodiment of the invention.

FIG. 8A is a cross-sectional view of the prior art configuration of scanning apparatus 410 shown in FIGS. 5 and 6 where the cross section is along the length of scanning bar assembly 450. FIG. 8B is a similar cross-sectional view of an embodiment of the invention shown in FIG. 7, but also includes the raised rim 539. In embodiments of the invention, whether one chooses a lateral dimension to be along the length of scan bar assembly 450 or along scanning direction 435 (FIG. 5), for embodiments of the invention a lateral dimension D of the platen 540 is equal to or substantially equal to a corresponding lateral dimension D of the frame 536, while in the prior art the lateral dimensions of the frame 436 are greater than the corresponding lateral dimensions of the platen 440 by at least 2 centimeters. In the example of FIG. 8B, frame 536 includes an outermost edge 531 and a lip 533 extending inwardly from outermost edge 531. Platen 540 is supported by lip 533 of frame 536. Lip 533 extends around a periphery of platen 540, so that it is shown at both ends of platen 540 in the cross-sectional view of FIG. 8B.

Figure 9:
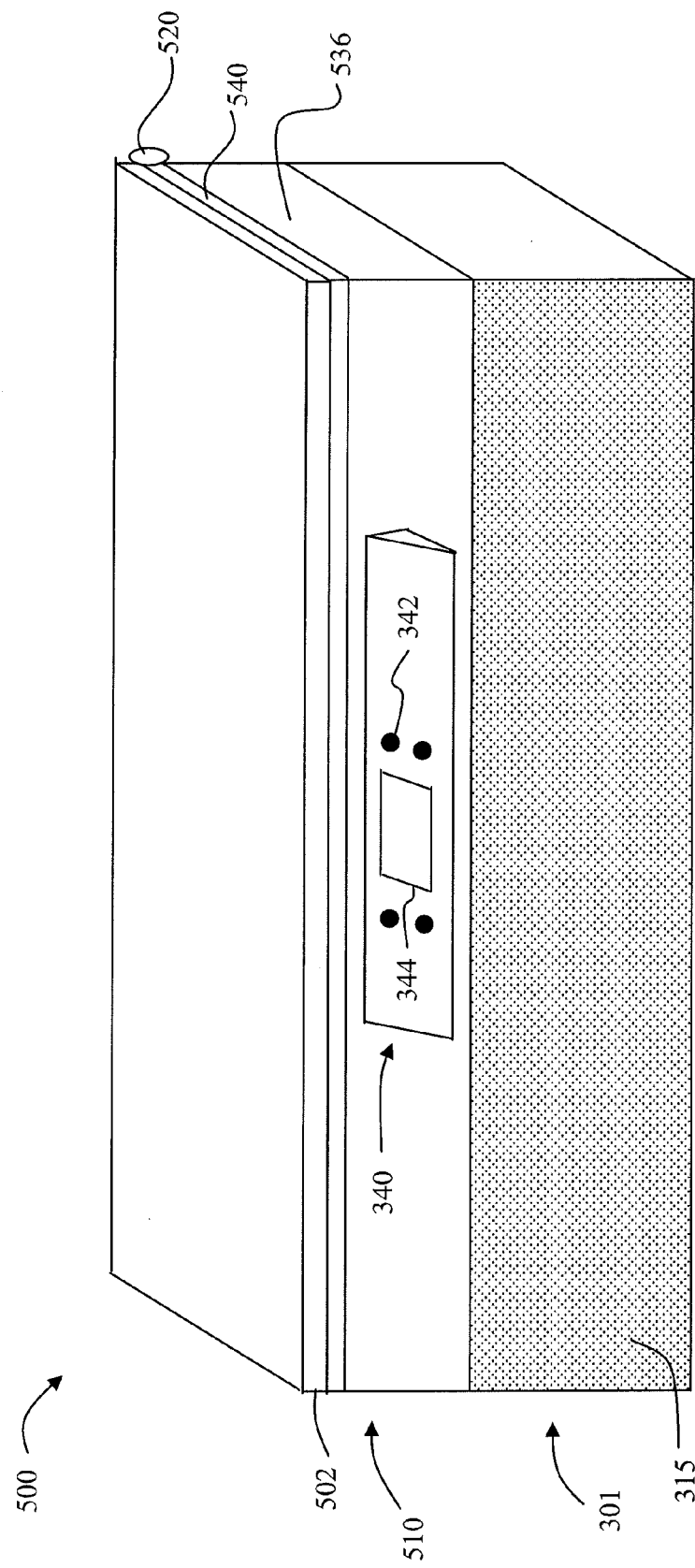
FIG. 9 is a perspective of the multifunction printing system according to an embodiment of the invention with the lid closed.

The aspects of the platen 540 being closer to the lid 502 than the frame 536 is when lid 502 is closed, and also the lateral dimensions D of the platen 540 being substantially the same as the lateral dimensions of the frame 536 are shown in FIG. 9, which is a perspective of an embodiment of multi-function printer 500 similar to the configuration of FIG. 7 with the lid 502 in its closed position. Also shown in FIG. 9 is lid attachment member 520. Lid attachment member 520 can be a simple hinge similar to hinge 432 in FIG. 5. Lid attachment member 520 can pivotably attach lid 502 to frame 536 or to platen 540. Lid attachment member 520 can include a regulator to control a rate of closure of lid 502. The regulator can include a damper that uses friction to prevent the lid 502 from closing too quickly. Referring to FIG. 9 lid 502 has four edges that are located near the first surface 541 (see FIG. 10) of platen 540. In some embodiments as shown partially in FIG. 9, when the lid 502 is in its closed position, all four edges are substantially in contact with platen 540. In some embodiments one or more elastomeric members 504 (FIG. 11) can be disposed on lid 502 or on platen 540 in order to provide a cushioned contact between lid 502 and platen 540. Elastomeric members 504 are typically mounted above the lip 533 (FIG. 8B) of frame 536 so that they are outside the scanning region that is viewable by scan bar assembly 450.

Also shown in the example of FIG. 9, multifunction printing system 500 includes a control panel 340 having control buttons 342 and a display 344. For embodiments where display 344 is a touch screen, control buttons 342 can be integrated into the touch screen rather than being separate from it. In some embodiments, control panel 340 can be a virtual front panel software application running on a mobile device, for example a smart phone, communicating to the apparatus wirelessly or by wired connection.

Figure 10:
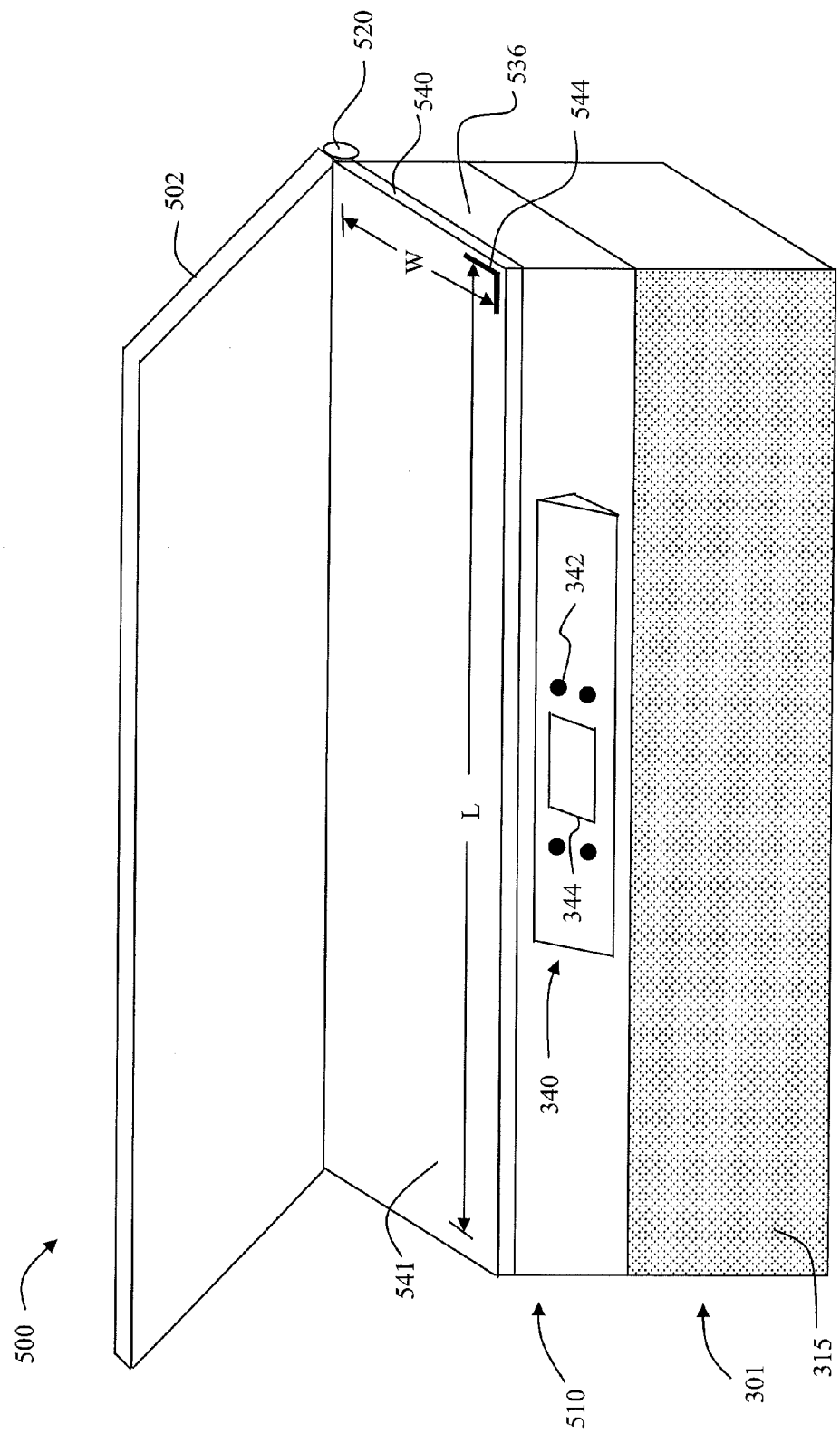
FIG. 10 is a perspective of the multifunction printing system according to an embodiment of the invention with the lid open.

FIG. 10 shows an embodiment similar to FIG. 9, but with lid 502 in its open position. In the embodiment of FIG. 10, lid attachment member 520 can be a simple hinge such that the edges of lid 502 near lid attachment member 520 remain near platen 540 when lid 502 is open. In the labeling convention of FIG. 10, the scanning region (corresponding to where the scan bar assembly 450 sends light to and receives light from objects to be scanned) of platen 540 has a length L along a direction parallel to the edge of platen 540 adjacent to which lid attachment member 520 attaches lid 502, and a width W along a direction perpendicular to that edge.

Figure 11:
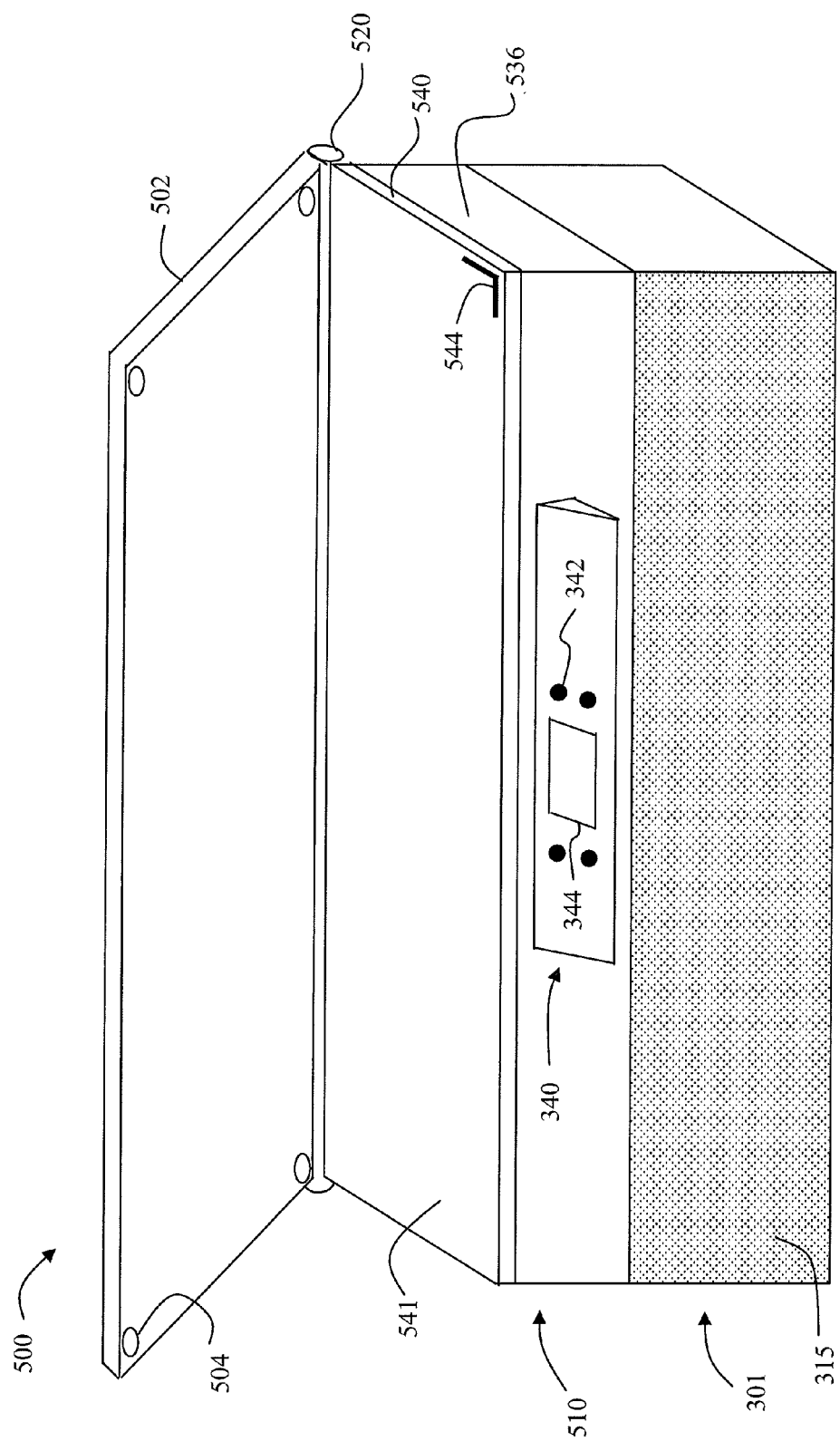
FIG. 11 is a perspective of the multifunction printing system according to another embodiment of the invention with the lid open.

FIG. 11 shows a similar embodiment to FIG. 10, but where lid attachment member 520 permits upward translational motion of lid 502 (so that all four edges of lid 502 are raised out of contact with platen 540) as well as a pivoting motion as lid 502 is moved to its open position. In that way, thicker items to be scanned can be accommodated between lid 502 and platen 540 when lid 502 is closed again. Unlike FIG. 5, FIGS. 10 and 11 are not cutaway views, so that scan bar assembly 450 and its associated components are not visible in FIGS. 10 and 11, but are similar to those shown in the cutaway view of FIG. 5.

The scanning region of platen 540 (corresponding to where the scan bar assembly 450 sends light to and receives light from objects to be scanned) needs to be transparent. Portions of the platen 540 that are beyond the scanning region are not required to be transparent. For example, platen 540 can include an alignment feature 544 that does not need to be transparent. Alignment feature 544 indicates, for example, where a corner of a document or other object to be scanned is to be placed for proper scanning. Alignment feature 544 can be a marking on platen 540, where the marking has negligible thickness. Alternatively, alignment feature 544 can have a height relative to the first surface 541 of platen 540 that is between 0.05 mm and 1 mm, so that a document or other object to be scanned can be butted against the alignment feature 544.

In order to provide optical clarity that is durable, platen 540 is typically made of glass. However, in some embodiments, platen 540 can be made of a plastic material having suitable optical quality and durability.

In some embodiments, as shown in FIGS. 8B, 10, and 11 no reflective backing plate 414 (FIG. 5) is provided. In order to provide an appropriate background for scanned documents, in some embodiments the portion of the lower surface of lid 502 corresponding to the scanning region is opaque and preferably white. In some embodiments, at least a portion of the lid 502 is transparent in order to provide a distinctive appearance. Such a lid 502 can be made of plastic or glass for example. In a portion of such a lid 502 having a transparent portion, another portion of the lid that corresponds to the scanning region is preferably opaque or translucent. For a glass lid, the translucent portion can be provided by frosting that portion of the glass by abrasion or etching for example.

Figure 12A:
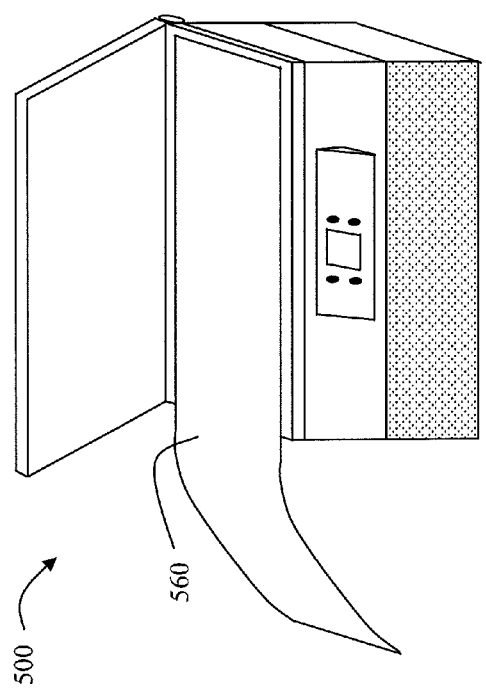
FIGS. 12A and 12B schematically show a first scan position and a second scan position moved along a slide direction of an oversized long document.
Figure 12B:
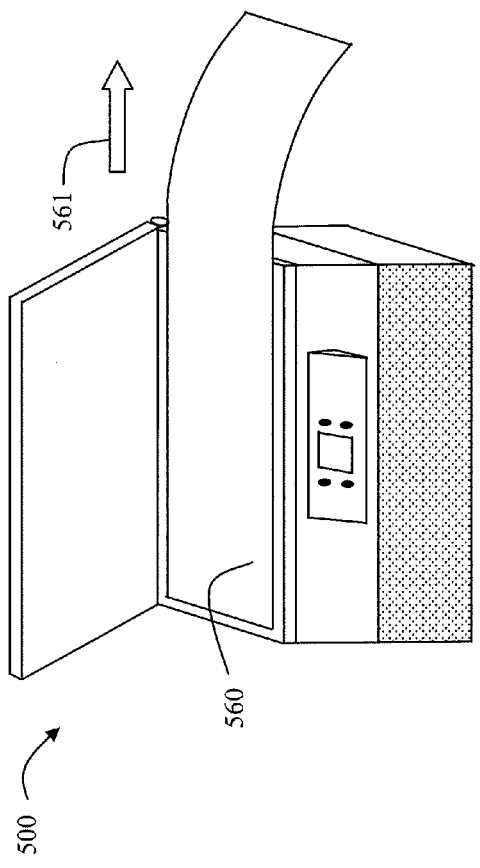
Figure 13A:
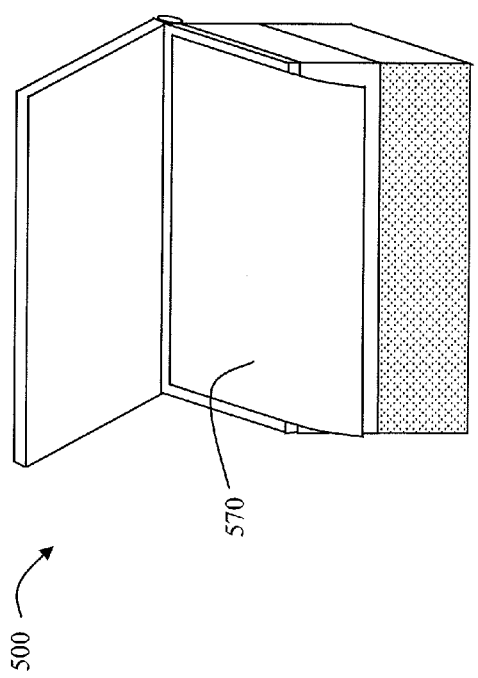
FIGS. 13A and 13B schematically show a first scan position and a rotated second scan position of an oversized wide document.
Figure 13B:
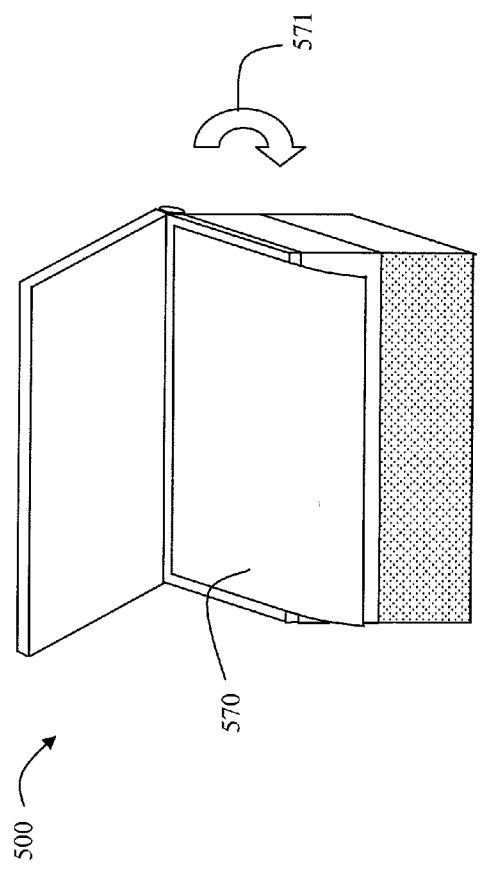

Having described the embodiments of multifunction printer 500, a context is provided for describing a method of scanning and copying oversized documents, where oversized documents are those having a length that is greater than the length L (FIG. 10) of the scanning region of scanning apparatus 510 or a width that is greater than the width W of the scanning region. FIG. 12A shows the scanning of an oversized long document 560 (having a length greater than L) in a firsts position, and FIG. 12B shows the scanning of the oversized long document 560 in a second position. Between FIG. 12A and FIG. 12B, oversized long document 560 has been moved along document slide direction 561, which is parallel to the edge of platen 540 that is adjacent lid attachment member 520 (FIG. 10). FIG. 13A shows the scanning of an oversized wide document 570 (having a width greater than W) in a first position, and FIG. 13B shows the scanning of the oversized wide document 570 in a second position. Typically simply sliding an oversized wide document 570 to a second position is not sufficient, because of interference with lid attachment member 520. Therefore in FIG. 13B oversized wide document 570 has been turned around 180 degrees as indicated by document turn arrow 571, so that the second position includes a rotation of oversized wide document 570 relative to the first position of FIG. 13A. Of course, some documents are both longer than L and wider than W, and will require a combination of the scan positions indicated in FIGS. 12 and 13.

FIGS. 14A and 14B represent the scanning in two positions of an oversized long document 560 having an image 580 of three stick figures, one with sunglasses, one with no glasses, and one with regular glasses. In FIG. 14A, the left side of oversized long document 560 up to first scan boundary 581 results in first scan 582. In FIG. 14B, the right side of oversized long document 560 up to second scan boundary 583 results in second scan 584. Note that the middle stick figure (the one with no glasses) is in an overlap portion 585 between the two scans.

After the two scans have been acquired they need to be assembled into a composite image. Controller 14 (FIG. 1) compares the image data in the first scan 582 to the image data in the second scan 584, identifies the overlap region 585 and selects a stitching edge 586 (FIG. 16) between first scan boundary 581 and second scan boundary 583. Controller 14 then stitches together the first scan 582 and the second scan 584 at the stitching edge 586 to form a composi scanned image representing the original image 580 that was on the oversized long document 560.

FIGS. 15A and 15B represent the scanning in two positions of an oversized wide document 570 having an image 590 of three stick figures, one with sunglasses, a small one with regular glasses, and one with no glasses. In FIG. 15A the top side of oversized wide document 570 up to first scan boundary 591 and results in first scan 592. In FIG. 15B the oversized wide document 520 is rotated 180 degrees and the bottom side is scanned up to second scan boundary 593 resulting in second scan 594. Note that the overlap portion 595 between the two scans includes the head of the small stick figure with regular glasses.

After the two scans have been acquired they need to be assembled into a composite image. Controller 14 (FIG. 1) rotates the image data in the second scan 594 by 180 degrees and then compares the image data in the first scan 592 to the rotated image data in the second scan 594, identifies the overlap region 595 and selects a stitching edge 586 between first scan boundary 591 and second scan boundary 593. Controller 14 then stitches together the first scan 592 and the rotated second scan 594 to form a composite scanned image representing the original image 590 that was on the oversized wide document 570.

Figure 16:
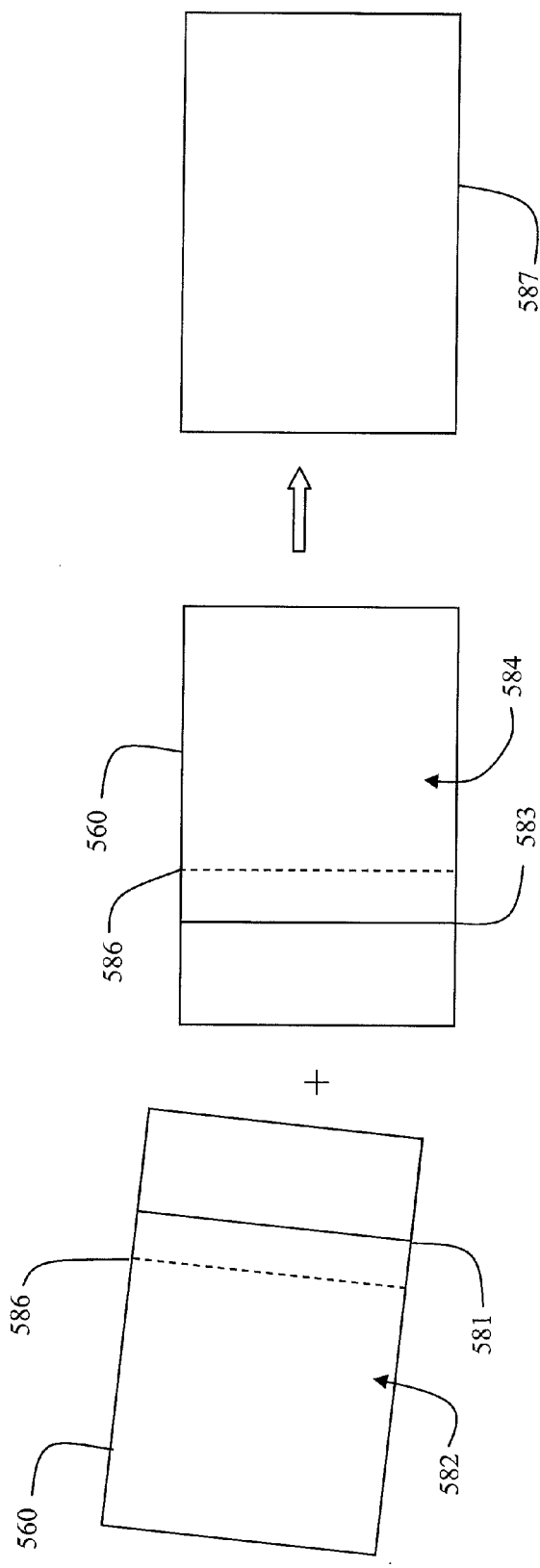
FIG. 16 schematically represents reorientation and translation of a first scan relative to a second scan to form an aligned composite image.

Typically the successive scans are offset from each other in translation and orientation. FIG. 16 schematically represents the alignment of a first scan 582 and a second scan 584 of an oversized long document 560. In this example, the image data corresponding to first scan 582 had to be rotated a few degrees to correct for relative skew between the first scan 582 and the second scan 584 and also moved downward in order to correct for relative offset between the first scan 582 and the second scan 584. After correcting for relative skew and relative offset, the stitching edges 586 are lined up in order to provide an aligned composite image 587. In some embodiments, the edges of the sheet can be used as a reference in addition to the stitching edges 586 for aligning the image data from the first scan 582 and the second scan 584.

Once the composite image 587 has been provided, it can be stored in memory or displayed on a monitor. Optionally composite image 587 can be edited. For example, a portion of interest can be cropped for printing on the printing apparatus 301 (FIG. 9) of multifunction printer 500. Typically the printing apparatus 301 of a multifunction printer 500 is not configured to print documents that are larger than the scanning region of scanning apparatus 510. Cropping the composite image 587 can allow printing the cropped portion of interest at full size. Alternatively the image can be scaled from the size of the composite image to a size that will fit (at lower magnification) on a recording medium size that the printing apparatus 301 can handle. Also optionally the composite image 587 can be sent to another printer that does have the capability of printing the entire composite image 587 at full size.

The present invention has been described in detail with particular reference to certain preferred embodiments thereof, but it will be understood that variations and modifications can be effected within the spirit and scope of the invention.

Parts List

10 Inkjet printer system
12 Image data source
14 Controller
15 Image processing unit
16 Electrical pulse source
18 First fluid source
19 Second fluid source
20 Recording medium
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
200 Carriage
250 Printhead
251 Printhead die
253 Nozzle array
254 Nozzle array direction
256 Encapsulant
257 Flex circuit
258 Connector board
262 Multi-chamber ink supply
264 Single-chamber ink supply
300 Printing mechanism
301 Printing apparatus
302 Paper load entry direction
303 Print region
304 Media advance direction
305 Carriage scan direction
306 Right side of printing mechanism
307 Left side of printing mechanism
308 Front of printing mechanism
309 Rear of printing mechanism
310 Hole (for paper advance motor drive gear)
311 Feed roller gear
312 Feed roller
313 Forward rotation direction (of feed roller)
315 Housing
320 Pick-up roller
322 Turn roller
323 Idler roller
324 Discharge roller
325 Star wheel(s)
330 Maintenance station
340 Control panel
342 Control button
344 Display
370 Stack of media
371 Top piece of medium
380 Carriage motor
382 Carriage guide rail
383 Encoder fence
384 Belt 390 Printer electronics board
392 Cable connectors
400 Multifunction printing system (with prior art scanning apparatus)
402 Lid
410 Scanning apparatus
414 Reflective backing plate
430 Body (of scanning apparatus)
432 Hinge
434 Scanning guide
435 Scanning direction
436 Frame
438 Offset
440 Platen
441 First surface (of platen)
442 Second surface (of platen)
450 Scan bar assembly
452 Photosensor array
454 Roller of scan bar assembly
456 Light source
500 Multifunction printing system
502 Lid
504 Elastomeric member
510 Scanning apparatus
520 Lid attachment member
531 Outermost edge (of frame)
533 Lip (of frame)
536 Frame
537 Uppermost support surface (of frame)
539 Raised rim
540 Platen
541 First surface (of platen)
542 Second surface (of platen)
544 Alignment feature
560 Oversized long document
561 Document slide direction
570 Oversized wide document
571 Document turn arrow
580 Image
581 First scan boundary
582 First scan
583 Second scan boundary
584 Second scan
585 Overlap portion
586 Stitching edge
587 Aligned composite image
590 Image
591 First scan boundary
592 First scan
593 Second scan boundary
594 Second scan
595 Overlap portion
d Diameter
D Lateral dimension
L Length
W Width

The invention claimed is:

1. A multifunction printer comprising:
a printing apparatus including:
a printing device for printing on recording medium;
a media advance system for moving the recording medium into position to be printed on by the printing device; and
a scanning apparatus including:
a platen including:
a transparent portion;
a first surface for supporting items to be scanned;
a second surface opposite the first surface;
a scan bar assembly disposed proximate the second surface of the platen;
a frame including an uppermost surface that is disposed proximate to the second surface of the platen, wherein the frame includes a lip extending inwardly from an outermost edge, wherein the second surface of the platen is supported on the lip of the frame; and wherein the uppermost surface of the frame is recessed relative to the first surface of the platen so that the first surface of the platen extends above the uppermost surface of the frame; and
a lid disposed proximate the first surface of the platen.

2. The multifunction printer of claim 1, wherein at least a portion of the lid is transparent.

3. The multifunction printer of claim 2, wherein a portion of the lid is translucent.

4. The multifunction printer of claim 2, wherein a portion of the lid is opaque.

5. The multifunction printer of claim 2, wherein the lid is plastic.

6. The multifunction printer of claim 1, wherein the platen is glass.

7. The multifunction printer of claim 1, wherein the lid is glass.

8. The multifunction printer of claim 1, wherein the lid is pivotably attached to the frame.

9. The multifunction printer of claim 1, wherein the lid is pivotably attached to the platen.

10. The multifunction printer of claim 1, the lid having four edges disposed proximate the first surface of the platen, wherein the lid includes:
a closed position such that all four edges are substantially in contact with the platen: and
an open position such that all four edges are raised out of contact with the platen.

11. The multifunction printer of claim 1, wherein the platen includes an alignment feature for aligning documents to be scanned.

12. The multifunction printer of claim 11, wherein the alignment feature is a marking on the platen.

13. The multifunction printer of claim 12, wherein the alignment feature has a height relative to the first surface of the platen that is between 0.05 mm and 1 mm.

14. The multifunction printer of claim 1, further including an elastomeric material for providing a cushioned contact between the lid and the platen.

15. The multifunction printer of claim 1, further including a regulator to control a rate of closure of the lid.

16. The multifunction printer of claim 15, wherein the regulator includes a damper.

17. The multifunction printer of claim 1, wherein the lip extends around a periphery of the platen.

18. The multifunction printer of claim 1, wherein a lateral dimension of the platen is equal to or substantially equal to a lateral dimension of the frame.

* * * * *